(12) United States Patent
Hayashi

(10) Patent No.: US 12,276,226 B2
(45) Date of Patent: Apr. 15, 2025

(54) ELECTRIC TURBOCHARGER

(71) Applicant: IHI Corporation, Tokyo (JP)

(72) Inventor: Katsunori Hayashi, Tokyo (JP)

(*) Notice: Subject to any disclaimer, the term of this patent is extended or adjusted under 35 U.S.C. 154(b) by 89 days.

(21) Appl. No.: 18/322,644

(22) Filed: May 24, 2023

(65) Prior Publication Data
US 2023/0296048 A1 Sep. 21, 2023

Related U.S. Application Data
(63) Continuation of application No. PCT/JP2022/000547, filed on Jan. 11, 2022.

(30) Foreign Application Priority Data
Feb. 12, 2021 (JP) .................. 2021-020997

(51) Int. Cl.
*F02C 6/12* (2006.01)
*F02C 7/06* (2006.01)

(52) U.S. Cl.
CPC .................. *F02C 6/12* (2013.01); *F02C 7/06* (2013.01); *F05D 2220/40* (2013.01); *F05D 2240/52* (2013.01); *F05D 2240/53* (2013.01); *F05D 2240/55* (2013.01); *F05D 2260/232* (2013.01)

(58) Field of Classification Search
CPC ... F01D 25/22; F05D 2240/52; F05D 2240/53
See application file for complete search history.

(56) References Cited

U.S. PATENT DOCUMENTS

| 10,082,111 B2 * | 9/2018 | Wu ........................ F02B 39/10 |
| 2019/0085768 A1 | 3/2019 | Keya |
| 2020/0332802 A1 | 10/2020 | Hwang |

FOREIGN PATENT DOCUMENTS

| JP | S63-138433 | 9/1988 |
| JP | S63-138433 U * | 9/1988 |
| JP | H5-001559 | 1/1993 |
| JP | 2000-130176 | 5/2000 |

(Continued)

OTHER PUBLICATIONS

International Preliminary Report on Patentability with Written Opinion dated Aug. 24, 2023 for PCT/JP2020/000547.

(Continued)

*Primary Examiner* — Courtney D Heinle
*Assistant Examiner* — Danielle M. Christensen
(74) *Attorney, Agent, or Firm* — SOEI PATENT & LAW FIRM

(57) ABSTRACT

An electric turbocharger includes: a thrust collar having a disk shape and provided to protrude in a flange shape around a rotation shaft between a compressor impeller and an electric motor; a thrust air bearing facing a compressor impeller-side surface of the thrust collar, and supporting the rotation shaft in a thrust direction; a thrust air bearing facing an electric motor-side surface of the thrust collar, and supporting the rotation shaft in the thrust direction; a bearing space which is interposed between the thrust air bearings and in which the thrust collar is accommodated; and a labyrinth seal portion provided along an outer peripheral surface of the thrust collar, and partitioning the bearing space into a first region on a compressor impeller side and a second region on an electric motor side.

18 Claims, 3 Drawing Sheets

(56) References Cited

FOREIGN PATENT DOCUMENTS

| | | |
|---|---|---|
| JP | 2005-155894 | 6/2005 |
| JP | 2012-062778 | 3/2012 |
| JP | 2017-002750 | 1/2017 |
| JP | 2020-090898 | 6/2020 |
| KR | 10-2020-0122497 | 10/2020 |
| WO | 2017/199695 | 11/2017 |

OTHER PUBLICATIONS

International Search Report dated Mar. 15, 2022 for PCT/JP2022/000547.

* cited by examiner

ELECTRIC TURBOCHARGER

CROSS-REFERENCE TO RELATED APPLICATIONS

This application is a continuation application of PCT Application No. PCT/JP2022/000547, filed on Jan. 11, 2022, which claims the benefit of priority from Japanese Patent Application No. 2021-020997, filed on Feb. 12, 2021. The entire contents of the above listed PCT and priority applications are incorporated herein by reference.

BACKGROUND

The present disclosure relates to an electric turbocharger.

An electric turbocharger described in Japanese Unexamined Patent Publication No. 2012-062778 is known. The electric turbocharger includes a compressor that generates and supplies compressed air to an internal combustion engine; a turbine that rotates a rotation shaft of the compressor using the energy of exhaust gas of the internal combustion engine; and an electric motor that assists the rotation of the rotation shaft.

In this type of electric turbocharger, a thrust force in a direction from a side of an electric motor toward a side of a compressor impeller acts on the rotation shaft. For this reason, specifications that can handle the thrust force are required for a support portion that supports the rotation shaft and the like. Therefore, it is desirable that the thrust force is small enough such that the required specifications for the support portion and the like do not become excessive. Therefore, the present disclosure describes an electric turbocharger that reduces a thrust force acting on a rotation shaft.

SUMMARY

An electric turbocharger according to one aspect of the present disclosure includes: a thrust collar protruding around a rotation shaft between a compressor impeller and a motor; a first air bearing that faces the thrust collar between the thrust collar and the compressor impeller; a second air bearing that faces the thrust collar between the thrust collar and the motor, wherein the first air bearing and the second air bearing form a bearing space in which the thrust collar is accommodated; a labyrinth seal that is provided along an outer peripheral surface of the thrust collar and partitions the bearing space into a first region and a second region, wherein the first region of the bearing space is closer to the compressor impeller and the second region of the bearing space is closer to the motor.

An electric turbocharger according to one aspect of the present disclosure includes: a rotation shaft; a compressor impeller, wherein a compressor impeller back space is formed on a side of a back surface of the compressor impeller; a motor disposed in a motor space in a motor housing; a first air bearing disposed between the motor and the compressor impeller; a second air bearing disposed between the motor and the first air bearing; and a spacer disposed between the first air bearing and the second air bearing; a pressure difference keeping structure that comprises the first air bearing, the second air bearing and the spacer and keeps a pressure difference between the motor space and the compressor impeller back space.

According to the electric turbocharger of the present disclosure, a thrust force acting on the rotation shaft may be reduced.

DETAILED DESCRIPTION

An electric turbocharger according to one aspect of the present disclosure includes: a thrust collar protruding around a rotation shaft between an impeller of a compressor and a motor; a first air bearing portion facing an impeller-side surface of the thrust collar, and supporting the rotation shaft in a thrust direction; a second air bearing portion facing a motor-side surface of the thrust collar, and supporting the rotation shaft in the thrust direction; a bearing space which is interposed between the first air bearing portion and the second air bearing portion and in which the thrust collar is accommodated; and a labyrinth seal portion that is provided along an outer peripheral surface of the thrust collar and partitions the bearing space into a first region that is an impeller-side region, and a second region that is an electric motor-side region.

An electric turbocharger according to one aspect of the present disclosure includes: a rotation shaft; a compressor impeller, wherein a compressor impeller back space is formed on a side of a back surface of the compressor impeller; a motor disposed in a motor space in a motor housing; a first air bearing disposed between the motor and the compressor impeller; a second air bearing disposed between the motor and the first air bearing; and a spacer disposed between the first air bearing and the second air bearing; a pressure difference keeping structure that comprises the first air bearing, the second air bearing and the spacer and keeps a pressure difference between the motor space and the compressor impeller back space.

The electric turbocharger according to the present disclosure may further include a discharge passage that communicates the second region with an outside. In addition, the discharge passage may include a communication passage formed in a housing to communicate the second region with the outside.

Hereinafter, an example of the present disclosure will be described with reference to the drawings. In the following description, with reference to the drawings, the same reference numbers are assigned to the same components or to similar components having the same function, and overlapping description is omitted. It should be noted that since featured parts may be exaggeratedly depicted as appropriate, the dimensional proportions of each part may not coincide between the drawings.

Figure 1:
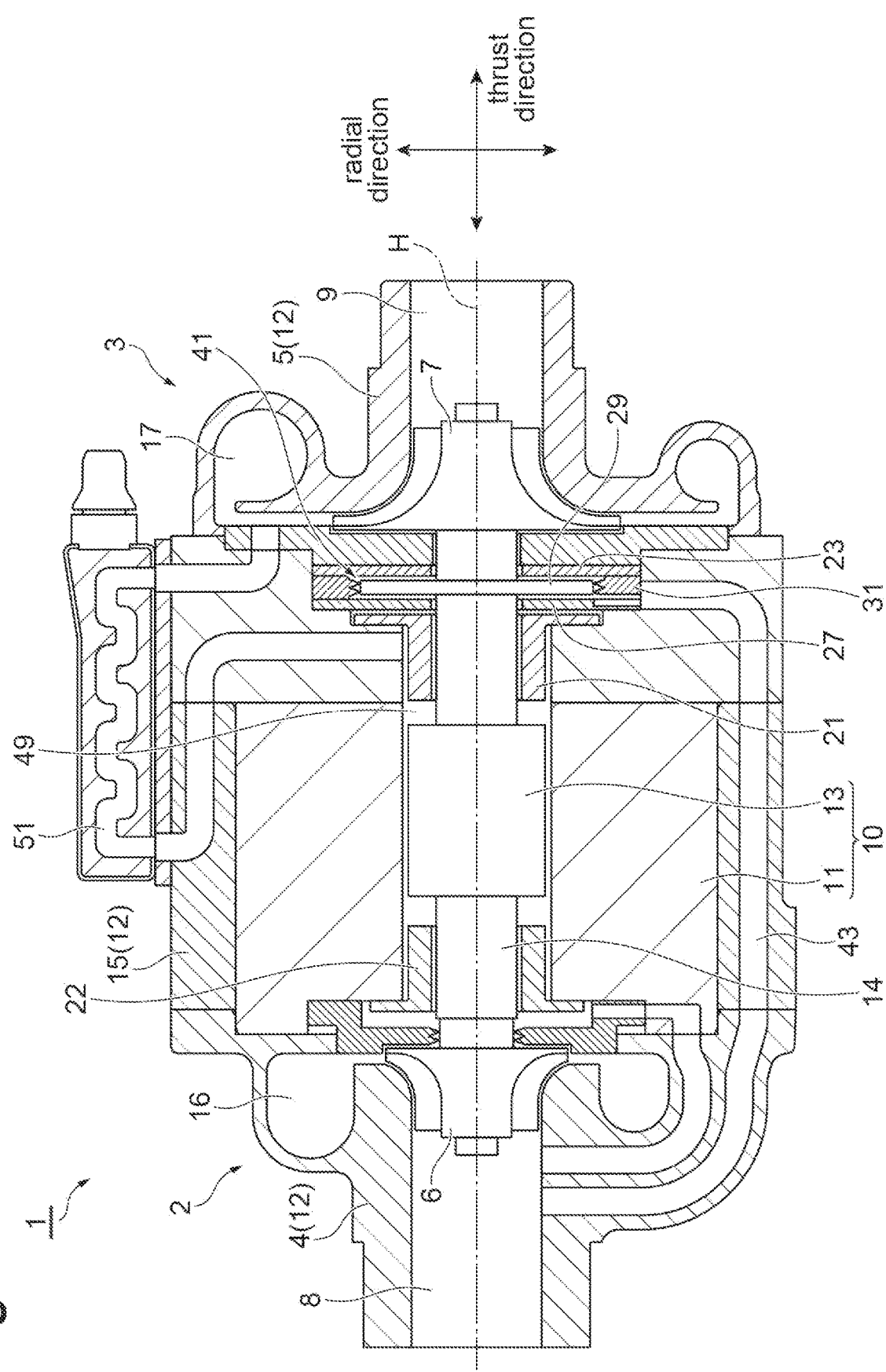
FIG. 1 is a cross-sectional view of an electric turbocharger according to an example.
Figure 2:
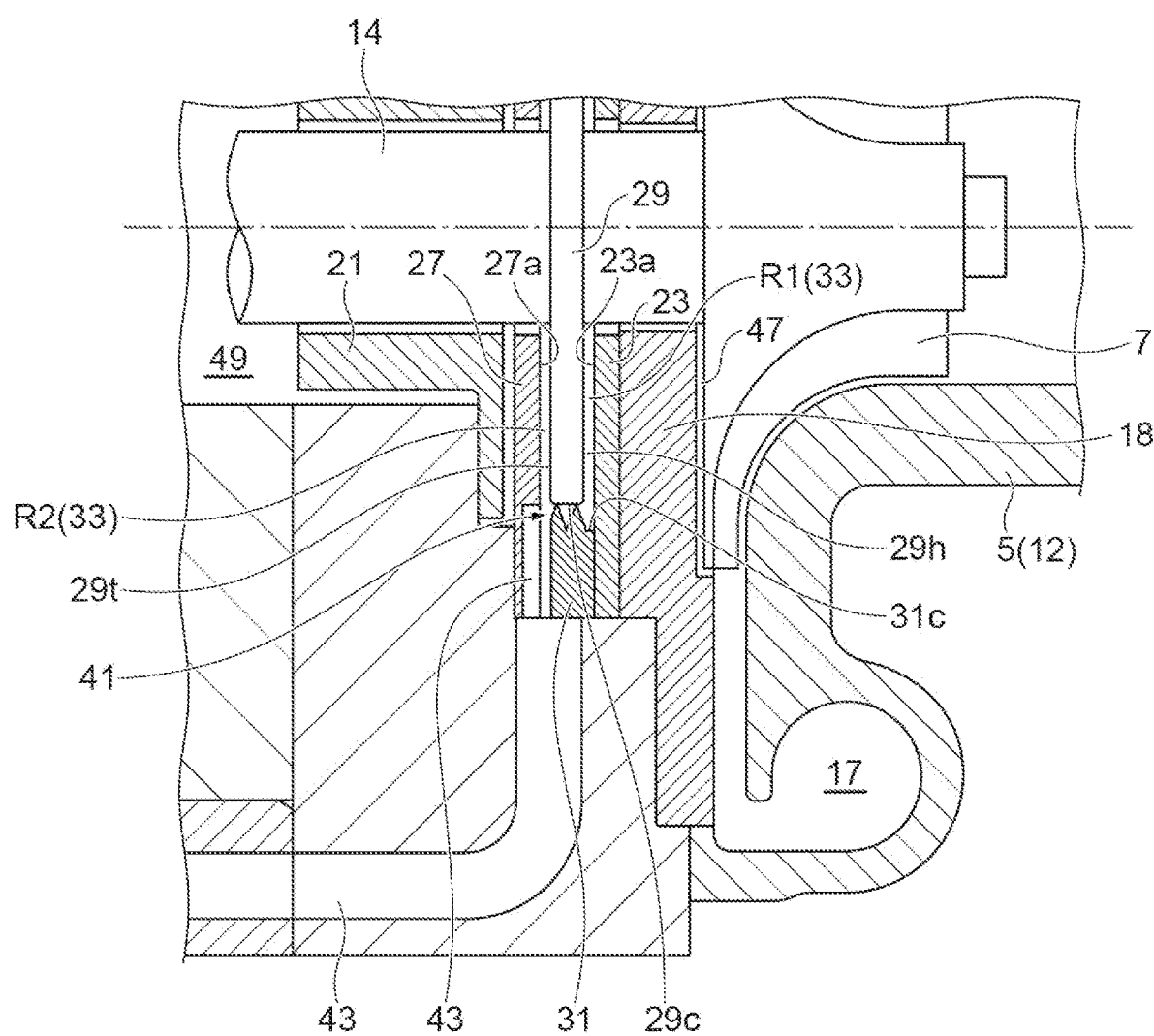
FIG. 2 is an enlarged cross-sectional view showing the vicinity of thrust air bearing portions of the electric turbocharger.

FIG. 1 is a cross-sectional view showing one example of an electric turbocharger 1, and FIG. 2 is an enlarged cross-sectional view showing a part of the electric turbocharger 1. The electric turbocharger 1 is an electrically assisted turbocharger used, for example, in vehicles or ships. The electric turbocharger 1 includes a turbine 2, a compressor 3, and an electric motor 10 provided between the turbine 2 and the compressor 3. The turbine 2, the compressor 3, and the electric motor 10 are built inside a housing 12 of the electric turbocharger 1.

Here, the housing 12 is roughly composed of a turbine housing 4, a compressor housing 5, and a motor housing 15.

The housing 12 may be composed of more subdivided parts. The turbine 2 includes a turbine impeller 6 disposed inside the turbine housing 4. The compressor 3 includes a compressor impeller 7 disposed inside the compressor housing 5. The motor housing 15 is installed between the turbine housing 4 and the compressor housing 5. A stator 11 of the electric motor 10 is fixed to the motor housing 15.

The turbine impeller 6 is fixed to a rotation shaft 14 of the compressor impeller 7. The rotation of the turbine impeller 6 is transmitted to the compressor impeller 7 via the rotation shaft 14. Therefore, when the turbine impeller 6 rotates, the compressor impeller 7 rotates. A rotor 13 of the electric motor 10 is fixed to the rotation shaft 14. The rotation of the rotation shaft 14 is assisted by cooperation between the rotor 13 and the stator 11.

In the electric turbocharger 1, exhaust gas discharged from an internal combustion engine (not shown) flows into the turbine housing 4 through a scroll 16, and rotates the turbine impeller 6 around a rotation axis H. The exhaust gas that has rotated the turbine impeller 6 is discharged in an axial direction through an outlet port 8 of the turbine 2. When the turbine impeller 6 rotates as described above, the compressor impeller 7 rotates via the rotation shaft 14. At this time, the electric motor 10 applies torque to the rotation shaft 14 to assist the rotation of the rotation shaft 14 and the compressor impeller 7. The rotating compressor impeller 7 suctions outside air in the axial direction through an inlet port 9, and discharges the air to a scroll 17. Then, compressed air compressed by the scroll 17 is supplied to the above-described internal combustion engine.

The rotation shaft 14 is rotatably supported by a plurality of bearings. For example, two radial bearings 21 and 22 are provided inside the motor housing 15, and the radial bearings 21 and 22 are disposed to interpose the rotor 13 therebetween in the axial direction. The rotation shaft 14 is supported in a radial direction by the radial bearings 21 and 22. In addition, a pair of thrust air bearings 23 and 27 and a thrust collar 29 having a disk shape are provided to support the rotation shaft 14 in a thrust direction. The pair of thrust air bearings 23 and 27 are disposed between the radial bearing 21 and the compressor impeller 7. The thrust collar 29 is provided to protrude in a flange shape around the rotation shaft 14. The thrust collar 29 is defined by surfaces 29h and 29t orthogonal to the rotation axis H, and an outer peripheral surface 29c that forms a columnar surface connecting the surfaces 29h and 29t. The outer peripheral surface 29c forms a columnar surface (cylindrical surface) with the rotation axis H as a column axis (cylindrical axis). The surface 29h (hereinafter, referred to as "front surface 29h") is a surface of the thrust collar 29 of a side of the compressor impeller 7. The surface 29t (hereinafter, referred to as "back surface 29t") is a surface of the thrust collar 29 of a side of the electric motor 10.

The thrust air bearing 23 (first air bearing portion) and the thrust air bearing 27 (second air bearing portion) are disposed in parallel and side by side with each other in the direction of the rotation axis H. The thrust air bearings 23 and 27 are integrally fastened together by a plurality fastening bolts in such a manner as to sandwich a spacer 31 therebetween. Then, the thrust air bearings 23 and 27 and the spacer 31 that are integrated are fixed inside the motor housing 15. The spacer 31 has a ring shape surrounding an outer periphery of the thrust collar 29, and has a larger axial thickness compared to the thrust collar 29. The thrust collar 29 is accommodated in a space surrounded by the thrust air bearings 23 and 27 and the spacer 31. In the accommodation space, the thrust collar 29 rotates in the state of non-contact with the thrust air bearings 23 and 27 and the spacer 31. The thrust air bearing 23 is disposed between the motor 10 and the compressor impeller 7, the thrust air bearing 27 is disposed between the motor 10 and the thrust air bearing 23, and the spacer 31 is disposed between the thrust air bearing 23 and the thrust air bearing 27.

The thrust air bearing 23 has a bearing surface 23a, and the bearing surface 23a faces the front surface 29h of the thrust collar 29. Similarly, the thrust air bearing 27 has a bearing surface 27a, and the bearing surface 27a faces the back surface 29t of the thrust collar 29. The space in which the thrust collar 29 is accommodated as described above is referred to as "bearing space 33". Namely, a space surrounded by the bearing surfaces 23a and 27a and the spacer 31 is the bearing space 33. In addition, a region between the front surface 29h of the thrust collar 29 and the bearing surface 23a of the thrust air bearing 23 within the bearing space 33 is referred to as "first region R1". In addition, a region between the back surface 29t of the thrust collar 29 and the bearing surface 27a of the thrust air bearing 27 within the bearing space 33 is referred to as "second region R2".

Figure 3:
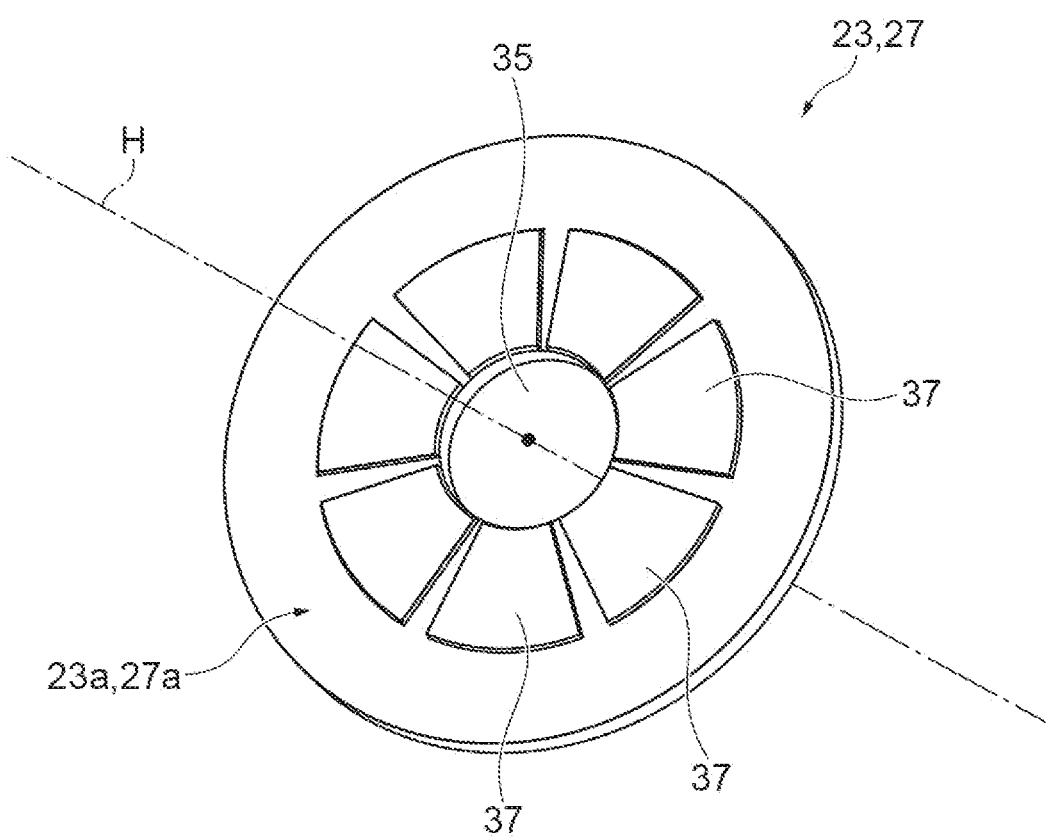
FIG. 3 is a perspective view showing the thrust air bearing portions.

As shown in FIG. 3, the thrust air bearings 23 and 27 are formed in an annular plate shape. Holes 35 through which the rotation shaft 14 are inserted are each formed at the centers of the thrust air bearings 23 and 27. A plurality of protrusions 37 each having a fan shape are formed on the bearing surface 23a of the thrust air bearing 23 at equal intervals in a circumferential direction. The protrusions 37 are formed, for example, in a structure including foils in the axial direction, and are raised with a slight thickness in the axial direction as thick as the foil. Meanwhile, the thrust air bearing 27 has the same configuration as that of the thrust air bearing 23. Namely, a plurality of the same protrusions 37 are formed on the bearing surface 27a of the thrust air bearing 27.

Due to the existence of the bearing surfaces 23a and 27a on which the protrusions 37 are formed in such a manner, during rotation of the rotation shaft 14, stable air films are formed in the first region R1 and the second region R2, and the air bearing function in the thrust direction of the rotation shaft 14 is realized. It should be noted that since thickness of the protrusions 37 is small, the protrusions 37 do not appear in the drawings of FIGS. 1 and 2.

In the electric turbocharger 1, as shown in FIG. 2, a labyrinth seal portion 41 is provided along the outer peripheral surface 29c of the thrust collar 29. The labyrinth seal portion 41 seals a gap between the outer peripheral surface 29c of the thrust collar 29 and an inner peripheral surface 31c of the spacer 31 which faces the outer peripheral surface 29c. The labyrinth seal portion 41 partitions the bearing space 33 into the first region R1 and the second region R2.

In the labyrinth seal portion 41, protruding portions protruding inward in the radial direction and extending in the circumferential direction are formed on the inner peripheral surface 31c of the spacer 31. The labyrinth seal portion 41 is formed by intermittently narrowing the gap between the outer peripheral surface 29c of the thrust collar 29 and the inner peripheral surface 31c of the spacer 31 via a plurality of such protruding portions. It should be noted that instead of forming the above-described protruding portions on the inner peripheral surface 31c of the spacer 31, the above-described protruding portions may be formed on the outer peripheral surface 29c of the thrust collar 29.

In addition, in the electric turbocharger 1, an air discharge passage 43 (refer to FIG. 1) that communicates the second region R2 with the outlet port 8 of the turbine 2 is formed.

The air discharge passage 43 (communication passage) includes a channel formed on the bearing surface 27a of the thrust air bearing 27 and a channel formed within the housing 12. Accordingly, the second region R2 communicates with the outside of the electric turbocharger 1 through the air discharge passage 43 and the outlet port 8. The air discharge passage 43 (communication passage) is formed in the housing 12 to communicate the second region R2 with the outside. During operation of the electric turbocharger 1, air within the second region R2 is discharged little by little to the outside through the air discharge passage 43 and the outlet port 8. The air discharge passage 43 of the present example communicates with the outlet port 8. However, an opening may be provided in the housing 12, and the air discharge passage 43 may communicate with the opening of the housing 12. Namely, the air discharge passage 43 provided in the housing 12 may directly communicate the second region R2 with the outside of the housing 12.

Subsequently, actions and effects of the electric turbocharger 1 described above will be described. Inside the housing 12 of the electric turbocharger 1, an impeller back space 47 (compressor impeller back space) is formed on a side of a back surface of the compressor impeller 7. The impeller back space 47 communicates with the bearing space 33 through a clearance between the rotation shaft 14 and the diffuser plate 18, and through a clearance between the rotation shaft 14 and the thrust air bearing 23. Specifically, the impeller back space 47 communicates with the first region R1 of the bearing space 33.

In addition, a motor space 49 in which the electric motor 10 is accommodated is formed inside the housing 12. The motor space 49 communicates with the bearing space 33 through a clearance between the rotation shaft 14 and the radial bearing 21 and through a clearance between the rotation shaft 14 and the thrust air bearing 27. Specifically, the motor space 49 communicates with the second region R2 of the bearing space 33. The thrust air bearing 23, the thrust air bearing 27, the spacer 31, the thrust collar 29 and the labyrinth seal portion 41 form a pressure difference keeping structure and the pressure difference keeping structure keeps a pressure difference between the motor space 49 and the impeller back space 47.

During operation of the electric turbocharger 1, since some of the air discharged from the compressor impeller 7 toward the scroll 17 flows into the impeller back space 47, the impeller back space 47 is a space with relatively high-pressure. Therefore, the first region R1 in communication with the impeller back space 47 within the bearing space 33 is also a space with relatively high-pressure. It should be noted that in this type of compressor of the related art, a labyrinth seal may be provided between the impeller back space 47 and the bearing space 33, however, since such a labyrinth seal does not exist in the electric turbocharger 1, the pressure difference between the impeller back space 47 and the first region R1 is small.

Meanwhile, some of air of a diffuser of the compressor 3 flows into the motor space 49 through a cooling air channel 51 (refer to FIG. 1) to cool the radial bearings 21, 22, and the like. Since the cooling air has a lower pressure compared to the pressure in the impeller back space 47, the motor space 49 has a lower pressure compared to the impeller back space 47, and the second region R2 in communication with the motor space 49 within the bearing space 33 is a space with relatively low-pressure. In addition, since air is discharged from the second region R2 to the outside through the air discharge passage 43 described above, the second region R2 is maintained at a relatively low pressure.

Further, since the first region R1 and the second region R2 are partitioned by the labyrinth seal portion 41, a pressure difference is generated between the first region R1 and the second region R2, and the first region R1 is at a higher pressure than the second region R2. In that case, due to the pressure difference, a force in a direction from the first region R1 toward the second region R2 (leftward in FIG. 1) acts on the thrust collar 29.

It should be noted that during operation of the electric turbocharger 1, the flow of air in the vicinity of the bearing space 33 is as follows. Air from the motor space 49 flows to the second region R2, and is discharged to the outside through the air discharge passage 43 and the outlet port 8. On the other hand, air from the impeller back space 47 flows to the first region R1, and slightly leaks to the second region R2 through the labyrinth seal portion 41 due to the above-described pressure difference. Thereafter, the leaked air merges with the air in the second region R2, and is discharged to the outside through the air discharge passage 43 and the outlet port 8.

In this type of turbocharger, it is known that a thrust force in a direction from the turbine impeller 6 toward the compressor impeller 7 (rightward in FIG. 1) acts on the rotation shaft 14. Meanwhile, according to the electric turbocharger 1, as described above, a force leftward in FIG. 1 acts on the rotation shaft 14 due to the pressure difference between the first region R1 and the second region R2. The leftward force partially offsets and reduces the thrust force above-mentioned. In such a manner, according to the electric turbocharger 1, the thrust force acting on the rotation shaft 14 may be reduced. Then, by reducing the thrust force, the required specifications for each part that supports the thrust force are also reduced. For example, when the thrust force is reduced, the thrust collar 29 and the thrust air bearings 23 and 27 may be reduced in size. As a result, the size of the electric turbocharger 1 may be reduced.

The present disclosure can be implemented in various modes with various modifications and improvements made based on the knowledge of those skilled in the art, including the example described above. In addition, modification examples can also be configured using the technical elements described in the above example. The configurations of the examples and the like may be combined and used as appropriate. For example, providing a channel such as the air discharge passage 43 to discharge the air in the second region R2 to the outside is not necessarily required, and for example, the air in the second region R2 may leak to the outside of the electric turbocharger 1 through gaps between components of the housing 12.

The invention claimed is:

1. An electric turbocharger comprising:
  a compressor impeller, wherein a compressor impeller back space is formed on a side of a back surface of the compressor impeller;
  a motor disposed in a motor space in a motor housing;
  a thrust collar protruding around a rotation shaft between a compressor impeller and a motor;
  a first air bearing that faces the thrust collar between the thrust collar and the compressor impeller;
  a second air bearing that faces the thrust collar between the thrust collar and the motor, wherein the first air bearing and the second air bearing form a bearing space in which the thrust collar is accommodated; and
  a labyrinth seal that is provided along an outer peripheral surface of the thrust collar and partitions the bearing space into a first region and a second region, wherein the first region of the bearing space is closer to the compressor impeller and the second region of the bearing space is closer to the motor,
wherein the motor space has a lower pressure compared to the compressor impeller back space.

2. The electric turbocharger according to claim 1, further comprising a discharge passage that communicates the second region with an outside.

3. The electric turbocharger according to claim 2,
wherein the discharge passage is formed in a housing to communicate the second region with the outside.

4. An electric turbocharger comprising:
a rotation shaft;
a compressor impeller, wherein a compressor impeller back space is formed on a side of a back surface of the compressor impeller;
a motor disposed in a motor space in a motor housing;
a first air bearing disposed between the motor and the compressor impeller;
a second air bearing disposed between the motor and the first air bearing;
a spacer disposed between the first air bearing and the second air bearing; and
a pressure difference keeping structure that comprises the first air bearing, the second air bearing and the spacer and keeps a pressure difference between the motor space and the compressor impeller back space, and
wherein the motor space has a lower pressure compared to the compressor impeller back space.

5. The electric turbocharger according to claim 4,
wherein the motor space communicates with a cooling air channel so that an air of a diffuser of a compressor flows into the motor space through the cooling air channel, and
wherein the compressor impeller back space communicates with the compressor impeller so that an air discharged from the compressor impeller and having a higher pressure than a cooling air in the cooling air channel flows into the compressor impeller back space.

6. The electric turbocharger according to claim 4,
wherein the first air bearing and the second air bearing are disposed in parallel and side by side with each other in a rotation axis direction.

7. The electric turbocharger according to claim 4,
wherein the first air bearing and the second air bearing are integrally fastened together to sandwich the spacer therebetween.

8. The electric turbocharger according to claim 4,
wherein the first air bearing, the second air bearing and the spacer form a bearing space;
wherein the pressure difference keeping structure further comprises:
a thrust collar that is disposed between the first air bearing and the second air bearing in the bearing space and protrudes around the rotation shaft; and
a labyrinth seal that is provided along an outer peripheral surface of the thrust collar and partitions the bearing space into a first region and a second region,
wherein the first region of the bearing space is formed by the first air bearing, the thrust collar, the spacer and the labyrinth seal, and
wherein the second region of the bearing space is formed by the second air bearing, the thrust collar, the spacer and the labyrinth seal.

9. The electric turbocharger according to claim 8,
wherein the compressor impeller back space communicates with the bearing space through a clearance between the rotation shaft and a diffuser plate, and a clearance between the rotation shaft and the first air bearing.

10. The electric turbocharger according to claim 8,
wherein the first region communicates with the compressor impeller back space,
wherein the second region communicates with the motor space, and
wherein the first region has a higher pressure compared to the second region.

11. The electric turbocharger according to claim 8,
wherein the spacer has a ring shape surrounding the outer peripheral surface of the thrust collar, and
wherein the spacer has a larger axial thickness compared to the thrust collar.

12. The electric turbocharger according to claim 8,
wherein the thrust collar is configured to rotate in a state of non-contact with the first air bearing, the second air bearing and the spacer in the bearing space.

13. The electric turbocharger according to claim 8,
wherein the first air bearing comprises a bearing surface facing the thrust collar, and
wherein the bearing surface of the first air bearing comprises a plurality of protrusions.

14. The electric turbocharger according to claim 13,
wherein each of the plurality of protrusions has a fan shape, and
wherein the plurality of protrusions are provided on the bearing surface of the first air bearing at an equal interval in a circumferential direction.

15. The electric turbocharger according to claim 13,
wherein the second air bearing comprises a bearing surface facing the thrust collar, and
wherein the bearing surface of the second air bearing comprises a plurality of protrusions.

16. The electric turbocharger according to claim 8,
wherein the labyrinth seal seals a gap between the outer peripheral surface of the thrust collar and an inner peripheral surface of the spacer which faces the outer peripheral surface of the thrust collar.

17. The electric turbocharger according to claim 16,
wherein the labyrinth seal comprises a plurality of protruding portions, and
wherein the plurality of protruding portions are formed on the inner peripheral surface of the spacer and protrudes inward in a radial direction and extending in a circumferential direction.

18. The electric turbocharger according to claim 17,
wherein the labyrinth seal is formed by intermittently narrowing the gap between the outer peripheral surface of the thrust collar and the inner peripheral surface of the spacer via the plurality of protruding portions.

* * * * *